March 20, 1962 | R. H. PINTELL | 3,026,486

SINE-WAVE GENERATOR

Filed May 28, 1958 | 5 Sheets-Sheet 1

INVENTOR:
Robert H. Pintell

BY

Karl F. Ross

AGENT.

March 20, 1962 R. H. PINTELL 3,026,486
SINE-WAVE GENERATOR
Filed May 28, 1958 5 Sheets-Sheet 2

INVENTOR:
Robert H. Pintell
BY
Karl F. Ross
AGENT.

INVENTOR:
Robert H. Pintell
BY
Karl F. Ross
AGENT.

March 20, 1962

R. H. PINTELL 3,026,486

SINE-WAVE GENERATOR

Filed May 28, 1958

5 Sheets-Sheet 4

INVENTOR:
Robert H. Pintell

BY

Karl F. Ross

AGENT.

INVENTOR:
Robert H. Pintell
BY
Karl F. Ross
AGENT.

United States Patent Office 3,026,486
Patented Mar. 20, 1962

3,026,486
SINE-WAVE GENERATOR

Robert H. Pintell, New York, N.Y., assignor, by mesne assignments, to Intron International, Inc., Bronx, N.Y.
Filed May 28, 1958, Ser. No. 738,585
13 Claims. (Cl. 331—113)

Figure 1:
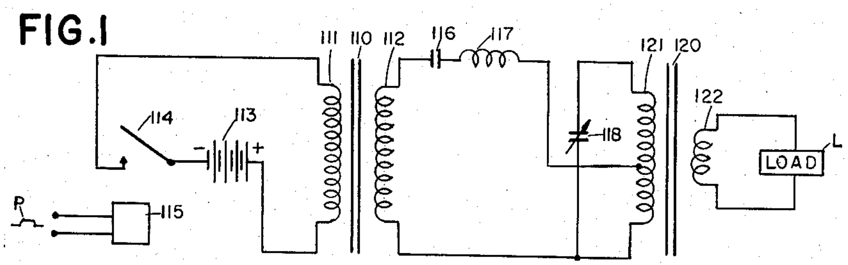

My present invention relates to an improved circuit arrangement for the generation of sine waves, either in response to a periodic input signal or as free-running oscillations.

The use of periodically reversed on-off switches in the art of signal generation is well known. Such switches, which may be in the form of electromagnetic relays, rotating contacts, gas-filled triodes, vacuum tubes and other electronic or semi-conductive discharge devices, have hitherto been employed to start and to stop the flow of a direct current in a driving circuit, this current acting (e.g. through a transformer) upon a load circuit to induce therein a secondary voltage of more or less sinusoidal character. With these known arrangements the harmonics content is high, frequency stability (in the case of a free-running oscillator) is poor and efficiency is low. Thus, such systems have heretofore found favor mainly for low-power applications and in the case of loads having a power factor of substantially unity.

The general object of my present invention is to provide an improved circuit arrangement for the generation of sinusoidal waves in which the above disadvantages are avoided.

Another object of my invention is to provide means for efficiently converting a direct or low-frequency (e.g. 60 cycles per second) alternating current into a substantially purely sinusoidal oscillation of stable, relatively elevated (e.g. 400 c.p.s.) frequency.

A more particular object of this invention is to provide a wave-generating system of the character set forth which lends itself to operation over a broad frequency spectrum, ranging from low audio frequencies into the microwave band, and can be used with widely different power factors.

A further specific object of the invention is to provide a wave generator having negligible dissipation in its driving and coupling circuits so as to be operable at close to 100% efficiency.

Yet another object of the instant invention is to provide an improved primary source of polyphase current.

The drawbacks of the oscillatory switching systems of the prior art can be traced to the fact that the reversals in the switching condition occur when the primary current is high. My present invention, accordingly, is based upon the discovery that it is possible to transfer power between two conductively or reactively interconnected circuits, advantageously but not necessarily coupled to each other by a transformer, through periodic switchover operations in the primary circuit occurring when the driving current in that circuit goes substantially to zero as a result of the decay of the current in the secondary circuit. In order to insure this decay, I include in the secondary circuit a tuned network resonant at the frequency of the switching cycle. If switching is accomplished by extraneous impulses, proper synchronization is automatic since the oscillations will occur preferentially under conditions of optimum power transfer; if, on the other hand, the switchover is controlled by feedback from the secondary circuit, synchronization must be assured through proper phasing of the feedback but the switching cadence will automatically correspond to the frequency of the tuned circuit.

When a square voltage wave is impressed upon a series-resonant circuit tuned to the fundamental frequency of the wave, the current through the circuit will be a sine wave of a frequency corresponding to said fundamental and of an amplitude determined by the series resistance of the circuit. In a system according to the invention it is desirable that this series resistance be very large in the absence of a load, in order to minimize the current drawn in the no-load condition. In a self-oscillatory system, however, the secondary circuit cannot be open if oscillations are to be sustained in the absence of a load; for this reason, and for the purpose of further stabilizing the operating frequency of the system, I prefer to insert in series with a combination of series-resonant reactance elements a combination of parallel-resonant reactance elements also tuned to the switching frequency. From this parallel-tuned circuit the feedback voltage can be conveniently derived with the aid of a transformer whose primary winding forms part of the inductive branch of that circuit. Instead of the series-resonant circuit mentioned above, I may utilize more generally any filter network which has a narrow pass band centered on the aforesaid switching frequency; similarly, the parallel-resonant circuit could be replaced by a more complex, preferably reactive network having a high impedance at this switching frequency.

It should be understood that a load which is either directly connected across the parallel-resonant circuit or is transformer-coupled thereto effectively places an impedance in parallel with that circuit which shifts its resonance frequency if the load is not purely resistive. Under such circumstances the two resonant circuits may, therefore, advantageously be relatively detuned to an extent sufficient to compensate for the load reactance and to insure proper phasing of the feedback, if any; to this end, either or both of these resonant circuits may have one or more adjustable reactance elements. Moreover, the isolation of the load from the parallel-resonant tank circuit by a large impedance minimizes the influence of the load power factor upon the operating frequency.

The invention can be embodied in both balanced and unbalanced circuit arrangements. In an unbalanced system, the current in the primary circuit will be switched alternately on and off; in a balanced system, a push-pull drive is realized by periodically reversing the direction of the primary current. A wide variety of bistable circuit elements, including those specifically enumerated above, are available to perform either type of switchover.

Figure 14:
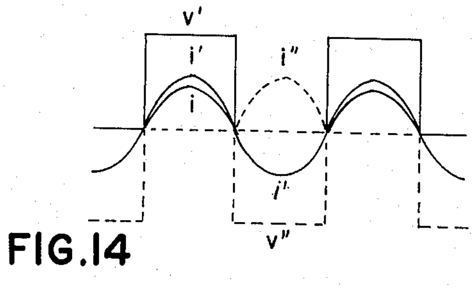

The above and other objects and features of my invention will become more fully apparent from the following detailed description, reference being had to the accompanying drawing in which:

FIGS. 1–13 are circuit diagrams of different sine-wave generators embodying the invention; and FIG. 14 is a graph illustrating the performance of a system as herein disclosed.

In FIG. 1 I have shown a system for the generation of sine waves in response to a train of control pulses P of square, sinusoidal or any other wave shape. The system comprises a coupling transformer 110 with a primary winding 111 and a secondary winding 112, a source 113 of direct current connected across primary 111 in series with a switch here shown as the armature 114 of an electromagnetic relay 115, a series-resonant circuit 116, 117 and a parallel-resonant circuit 118, 121 serially connected across the secondary 112, and an output transformer 120 whose primary winding is constituted by the inductance 121 of the parallel-resonant circuit and whose secondary winding 122 is connected across a load L. The operation of the system is as follows:

With the relay 115 periodically operated and released by its pulses P, the voltage of battery 113 is intermittently impressed upon primary 111 as indicated by the square-wave pulses $v'$ (solid line) in FIG. 14. A similar voltage wave is induced in the secondary 112 but, with both circuits 116, 117 and 118, 121 tuned to the fundamental frequency of that wave, only a sinusoidal current $i$ can flow in the secondary circuit. Thereby a pulsating current $i'$ is drawn from battery 113, it being apparent from FIG. 14 that both currents $i$ and $i'$ are substantially zero just before and after the voltage $v'$ is switched either on or off. Thus, the switching operation absorbs virtually no energy stored in the reactances of the generator and the efficiency of the system is very high.

With the series-resonant circuit 116, 117 connected to a tap on the reactive branch 121 of the parallel-tuned circuit, the current circulating in the tank circuit 118, 121 will be of larger amplitude than the one passing through winding 112. Furthermore, I have shown the condenser 118 of this tank circuit to be adjustable for the purpose of maintaining it precisely tuned to the cadence of the pulses P if loads of different power factor are connected across secondary winding 122.

Figure 2:
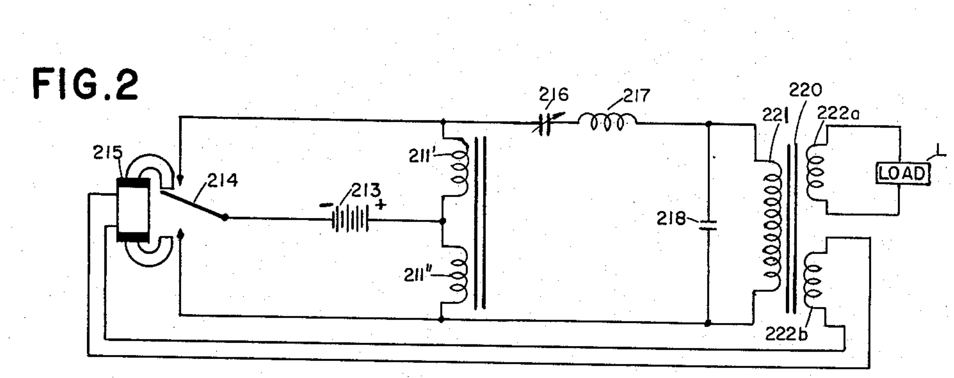

In FIG. 2 the relay 215 is polarized and controls an armature 214 which causes current from battery 213 to pass alternately through two inductances 211', 211'' whose junction is returned to the battery. Serially connected across the impedance combination 211', 211'' are a series-resonant circuit 216, 217 and a parallel-resonant circuit 218, 221, inductance 221 being the primary of a transformer 220 having a secondary 222a connected across a load L. Another secondary winding 222b of this transformer controls the polarized relay 215.

With this arrangement the sinusoidal output delivered to transformer 220 is fed back to the relay 215 to control the switching of its battery voltage. Because of the push-pull arrangement of the relay circuit, the driving voltage impressed upon the reactive network 216, 217, 218, 221 will be composed of pulses $v'$, $v''$ of alternate polarity, as indicated in FIG. 14, while the pulsating battery current will have the wave shape $i'$, $i''$. Here, too, we can distinguish between a primary and a secondary circuit which, however, are interconnected conductively and not reactively as in the embodiment of FIG. 1. With the armature 214 in the position shown in the drawing, the primary circuit consists of the inductance 211' in series with battery 213 whereas the secondary circuit consists of inductance 211'' in series with reactances 216, 217 and the parallel-resonant network 218, 221. With each of inductances 211' and 211'' dimensioned so as to resonate, together with inductance 217 (which in this case could also be omitted), the condenser 216 at the switching frequency of relay 215, hence at the resonance frequency of network 218, 221 as modified by the load L, the fundamental of voltage wave $v'$, $v''$ will be developed substantially without attenuation across the parallel resonant network to drive the output current through the load. Since the coil 211' represents a high impedance at the fundamental switching frequency and its harmonics, the current drawn by the primary circuit will again be negligible. When the relay 215 reverses, an analogous situation exists with the roles of inductances 211' and 211'' interchanged. As in the preceding embodiment, the voltage switchover occurs at an instant of zero primary and secondary current.

In the system of FIG. 2, changes in the power factor of load L may have some effect upon the frequency of tank circuit 218, 221 so that the control voltage fed back to switching relay 215 will no longer oscillate at precisely the resonance frequency of tuned circuit 211' (or 211''), 216, 217. Since this may give rise to a slight phase shift between the voltage and the current shown in FIG. 14, with a resulting increase in circuit dissipation, I may make either or both of the reactances of the series-tuned circuit adjustable as indicated for the condenser 216. It will be understood, however, that it is also possible in this system to provide for a compensating adjustment of the parallel-tuned circuit by making either or both reactances variable, as illustrated in FIG. 1, and that conversely the elements of the series-tuned circuit 116, 117 of FIG. 1 could also be made adjustable. Similar observations apply to the embodiments of the succeeding figures.

Figure 3:
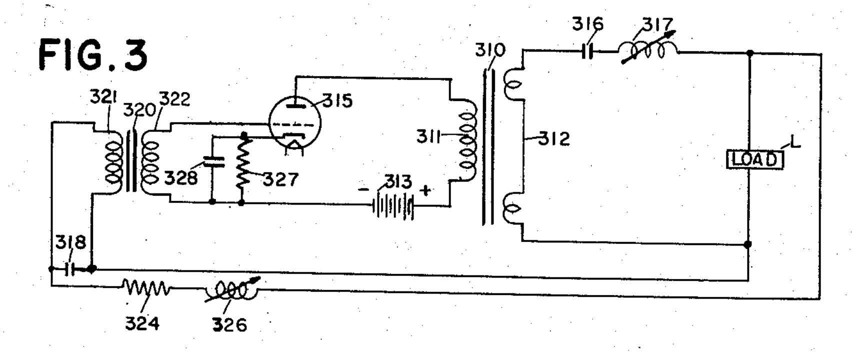

In FIG. 3 a vacuum triode 315 has been substituted for the electromagnetic relays of the preceding figures. Primary winding 311 of coupling transformer 310 is connected across the plate-cathode circuit of tube 315 in series with battery 313; the grid-cathode circuit of this tube is biased to cutoff under operating conditions by a resistance-capacitance network 327, 328 connected in series with the secondary winding 322 of transformer 320. The primary winding 321 of this transformer forms part of a tank circuit which also includes the condenser 318 and is connected through a large resistor 324 and a reactance 326 (here shown as a variable inductance) to the elements 312, 316 and 317 of the secondary circuit of transformer 310. Load L is here shown connected directly across this circuit in shunt with the network 318, 321 and 324, 326.

The operation of the system of FIG. 3 is analogous to that of the generator of FIG. 2 with either one of its primary winding halves 211', 211'' omitted. Inductance 326 serves to compensate the effect of load L upon the frequency of resonant circuit 318, 321. The provision of series resistor 324 substantially eliminates the influence of the load upon the operating frequency of resonant circuit 318, 321, yet for purposes of optimum feedback phasing the inductance 317 of the series-tuned circuit has been shown adjustable.

Figure 4:
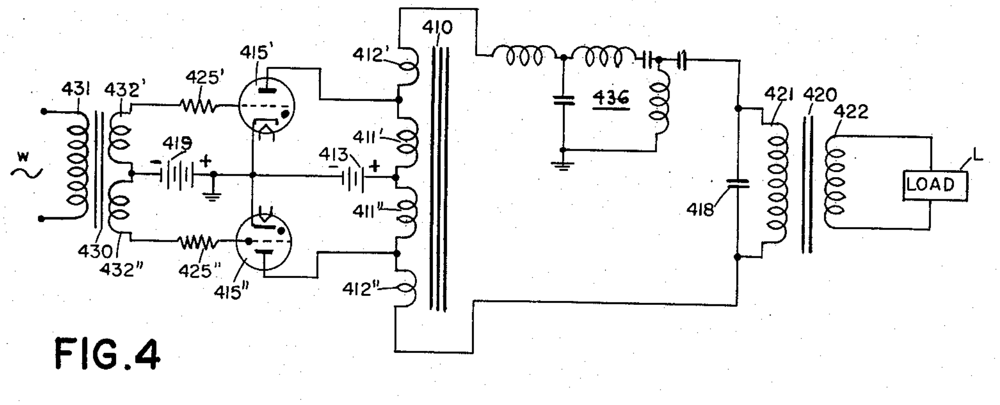

In FIG. 4 there is shown a system for converting a distorted sine wave W into a purely sinusoidal oscillation applied to the load L. Wave W, which could also consist of a train of discontinuous pulses, is impressed upon the primary winding 431 of an input transformer 430 whose secondary winding consists of two halves 432', 432'' respectively connected across the grid-cathode circuit of two thyratron tubes 415', 415'' in series with a biasing battery 419. Resistors 425', 425'' are also inserted in the input circuits of the thyratrons to minimize the flow of grid current. The plate-cathode circuits of these thyratrons are connected in push-pull across respective winding sections 411', 411'' of an autotransformer 410, in series with battery 413, while a secondary circuit extends from the thyratron plates through other winding sections 412', 412'' of the transformer, band-pass filter 436, and parallel-tuned circuit 418, 421. Load L is energized from the secondary winding 422 of output transformer 420. Filter 436, replacing the series-resonant circuit of the preceding figures, has an infinite impedance at zero frequency and passes a narrow frequency band centered on the frequency of input wave W.

The voltage of battery 413 is lower than the firing potential of tubes 415', 415'' which become de-ionized when the voltage across the associated primary-winding section 411' or 411'' approaches zero. The performance of the system of FIG. 4 is otherwise similar to that of the circuit arrangement of FIG. 1.

Although in the foregoing embodiments I have illustrated the use of electromagnetic relays, vacuum tubes and gas-filled tubes as switching elements, I prefer to employ transistors for this purpose on account of their low inherent energy dissipation. While transistors are therefore shown in all subsequent embodiments, it should be understood that in principle these elements are interchangeable and any of them may be used in either single-ended or push-pull-type circuits as described, for example, in connection with FIGS. 3 and 4. Furthermore, I have only illustrated N-type transistors but P-type transistors may also be used with reversals of polarity as is well known in the art. The transistors shown, moreover, are representative of both point-contact and junction-type devices and are also illustrative of other solid-state switching elements, such as double-base diodes, controlled rectifiers, thyristors or the like, as well as magnetoresistive devices, e.g. as shown in my co-pending application Ser. No. 603,060, filed August 9, 1956, now Patent No. 2,941,158.

Figure 5:
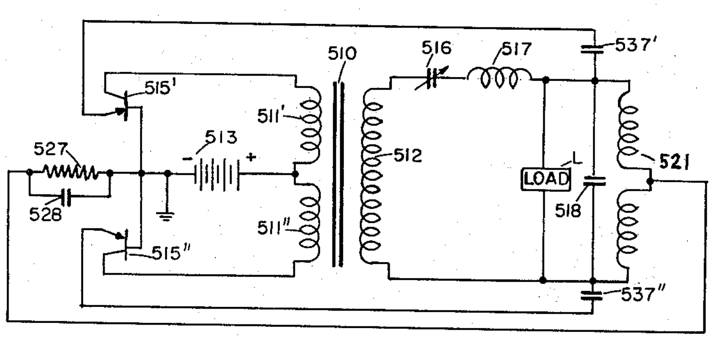

FIG. 5 shows two transistors 515′, 515″ in grounded-base connection, having their collector-base circuit connected in series with battery 513 across respective halves 511′, 511″ of the primary winding of transformer 510. The secondary winding 512 of this transformer is connected in series with reactances 516 and 517 across the load L which is in shunt with tank circuit 518, 521; inductance 521 has its extremities connected, via respective feedback condensers 537′, 537″, to the emitters of transistors 515′ and 515″ and has its midpoint returned to their bases through biasing network 527, 528. The operation is analogous to that of the system of FIG. 2.

Figure 6:
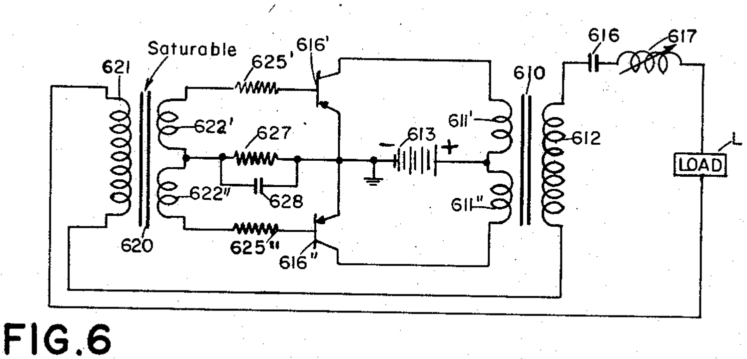

The system of FIG. 6 utilizes a saturable feedback transformer 620 whose primary 621 is connected in series with the load L, this transformer saturating at a rate commensurate with the discharge rate of condenser 616 through inductance 617 so as to be in resonance with the operating frequency of the system. A square voltage wave similar to that shown in FIG. 14 will thereby be impressed upon the transistors 616′, 616″ whose grounded emitters are connected through battery 613 to the junction point of primary halves 611′ and 611″. The base-emitter circuits of the transistors include, in series with respective resistors 625′, 625″ and sections 622′, 622″ of transformer 620, a biasing network which is similar to that of FIG. 5 and consists of a resistor 627 bridged by a condenser 628. This network allows oscillations in the system to build up from zero amplitude when battery 613 is first connected in circuit.

Figure 7:
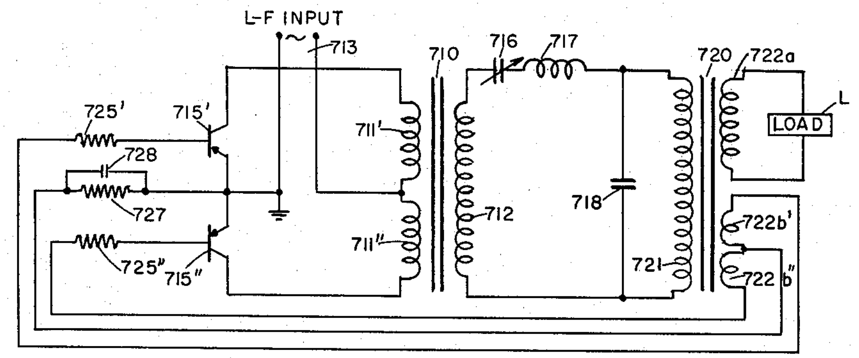

FIG. 7 represents a further modification of the system of FIG. 5 in which the transistors 715′, 715″ have their emitters maintained at fixed potential and connected to the respective collectors through winding halves 711′, 711″ of transformer 710 in series with a source 713 of low-frequency alternating voltage. Their bases are returned to the associated collectors through respective resistors 725′, 725″, sections **722*b*′, 722*b*″ of one of the secondary windings of transformer 720, and biasing network 727, 728. Load L is connected across the other secondary winding 722*a* of transformer 720 whose primary winding 721, tuned by condenser 718, is connected across transformer winding 712 in series with condenser 716 and inductance 717. Since the resonant circuit 716, 717 is opaque to the frequency of source 713**, this frequency will not appear in the output of the oscillator.

Figure 8:
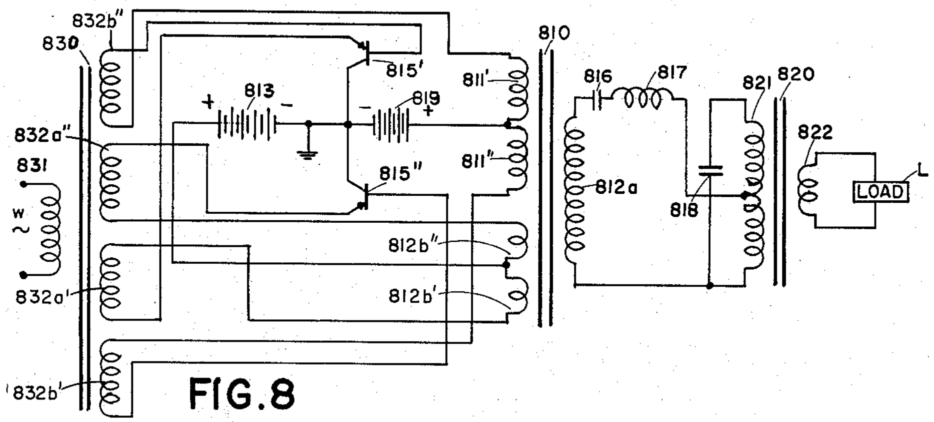

In still another modification, illustrated in FIG. 8, the transistors 815′, 815″ are in grounded-collector connection and have their bases connected to the collectors by way of biasing battery 819 in series with respective secondary windings **832*b*′, 832*b*″ of input transformer 830 and winding sections 811′, 811″ of transformer 810. The secondary 812*a* of this transformer is again connected, in the manner illustrated in FIG. 1, to a tap on the primary 821 of an output transformer 820 whose secondary 822 works into the load L. Condenser 816, 818 and inductance 817** are arranged in a manner analogous to that of FIG. 1.

The input circuits of the transistors 815′ and 815″, connected between the emitters and the collectors thereof, include the battery 813 in series with secondary windings **832*a*′, 832*a*″ of input transformer 830 and with the halves 812*b*′, 812*b*″ of another secondary winding on transformer 810. This latter connection produces a regenerative feedback of square-wave voltage causing a more instantaneous response of the system to triggering by input transformer 830 in response to the control wave W applied to the primary winding 831** of this transformer. Thus, the system of FIG. 8 has a sensitivity considerably above that of the externally controlled wave generators previously described.

It will be understood that the choice of grounded-base, grounded-emitter or grounded-collector connection in any of the transistor embodiments of the present invention is not critical and that these connections may be interchanged. With grounded collectors, however, the provision of supplemental driving windings as shown at **832*b*′, 832*b*″** is desirable to prevent "cathode follower" action whereby the base potential would remain close to the emitter potential and the desired sharp "on-off" switching operation would not be realized.

Figure 9:
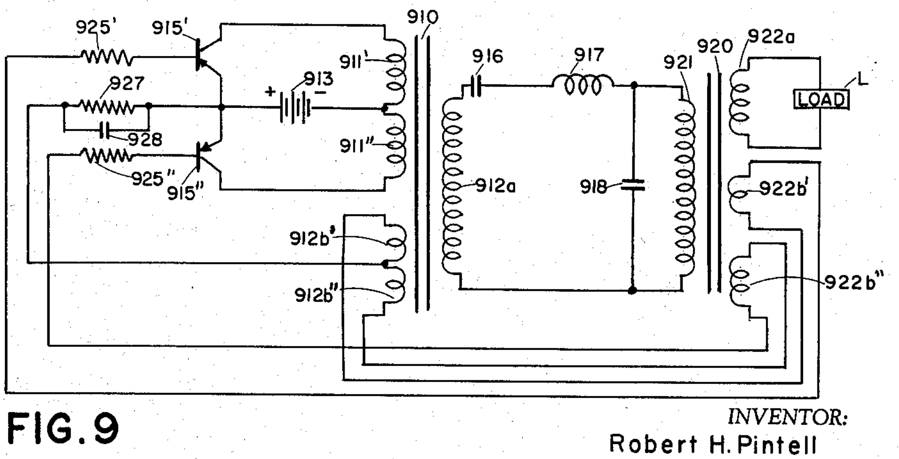

In FIG. 9 I have shown a combination of regenerative square-wave feedback from coupling transformer 910 with sinusoidal switch-control feedback from output transformer 920. Thus, the bases of transistors 915′, 915″ are returned to their emitters by way of respective resistances 925′, 925″, secondary windings **922*b*′, 922*b*″ on transformer 920 and winding halves 912*b*′, 912*b*″ on transformer 910, as well as resistance-capacitance network 927, 928. The transistor output circuits are similar to those of FIG. 7 and include the battery 913 connected between their emitter and collector electrodes in series with respective winding halves 911′, 911″. The tuned secondary circuit of transformer 910 is similar to that of FIG. 7 and comprises winding 912*a*, condensers 916, 918 and inductances 917, 921, with the load L again connected across a secondary 922*a*** of the output transformer.

The transistors 915′ and 915″ act as a pair of saturable switching devices, connected in push-pull, whereby current from the battery 913 passes alternately through the winding halves 911′ and 911″ whose junction is returned to the negative battery terminal. A square wave similar to that designated *v′* (solid lines) in FIG. 14 is induced in the secondary winding **912*a* of transformer 910 during the half-cycle in which transistor 915′** is conductive while a wave similar to that designated *v″* (dot-dash lines) is induced in the secondary **912*a* during the half-cycle in which transistor 915″ is unblocked. Since, however, both the series-connected components 916, 917 and the parallel-connected components 912*a*, 918, 921** are independently tuned to the desired frequency which is the fundamental frequency or cadence of the square wave, only a sinusoidal current *i* (FIG. 14) can flow in the secondary circuit. A similar current flows in the output winding **922*a* of the output transformer 920, whose primary winding 921 is connected in the secondary circuit, and, therefore, also through the load L. A sinusoidal current also flows in the secondary windings 922*b*′ and 922*b*″ of the output transformer. These windings are inserted in a feedback path which also includes the winding halves 912*b*′ and 912*b*″. The sinusoidal control current derived from secondary winding 922*b*″ is distorted by the superimposed square wave of like fundamental frequency induced in winding halves 912*b*′ and 912*b*″**, the resulting composite wave having steep flanks so as to cause the alternate blocking and unblocking of the transistors with a minimum of lag.

Figure 10:
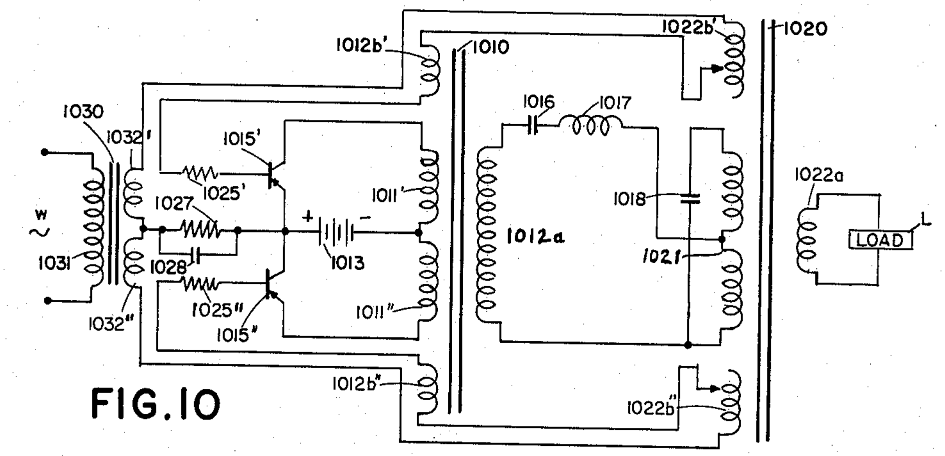

FIG. 10 illustrates a combination of the features of FIGS. 8 and 9, including a pair of transistors 1015′, 1015″ whose base-emitter circuits include respective resistors 1025′, 1025″, square-wave-feedback windings **1012*b*′, 1012*b*″ on transformer 1010, sine-wave-feedback windings 1022*b*′, 1022*b*″ on transformer 1020, and winding halves 1032′, 1032″ on transformer 1030, all in series with biasing network 1027, 1028. The primary winding halves 1011′, 1011″ of transformer 1010 are again connected in the emitter-collector circuits of the transistors in series with battery 1013. Secondary 1012*a* of transformer 1010 works into a circuit similar to that of FIG. 8, including capacitances 1016, 1018 and inductances 1017, 1021. Another secondary winding 1022*a* on transformer 1020** is connected across the load L.

The secondary windings **1022*b*′, 1022*b*″ of transformer 1020 have been shown adjustable for the purpose of varying the ratio of feedback voltage to driving voltage as applied by the transformer 1030** in response to an input wave W. In this manner it is possible to operate the wave generator of FIG. 10 either as a free-running oscillator of stable frequency, as a controlled oscillator adapted to be locked in step with the controlling oscillation W, or a regenerative amplifier which is non-oscillatory in the absence of an input signal.

Figure 11:
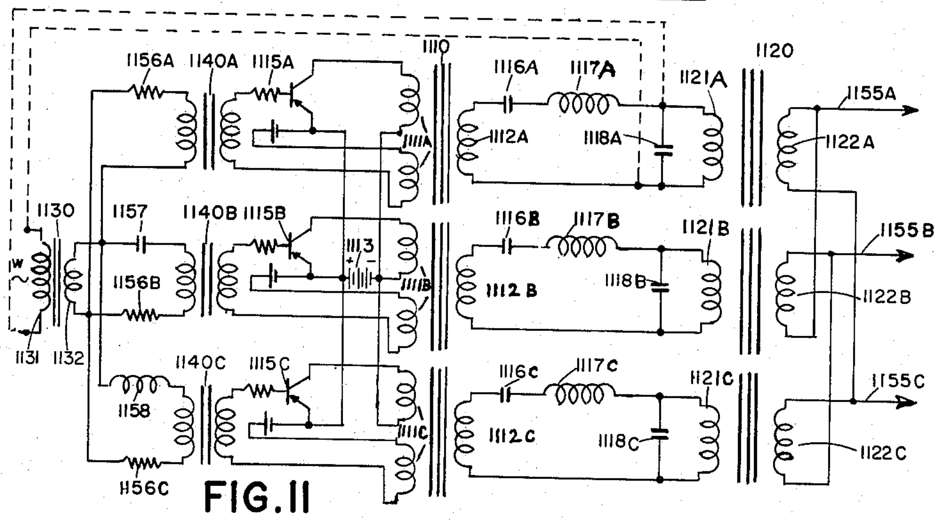

FIG. 11 illustrates the adaptation of my invention to a three-phase system. The wave generator shown in that figure comprises three transistors 1115A, 1115B and 1115C whose circuits are all similar to that of transistor 815' or 815'' of FIG. 8 and need not be described in detail. These transistors receive their operating potential from a common battery 1113 and are energized, in response to a control wave W, via an input transformer 1130 and auxiliary transformers 1140A, 1140B, 1140C. Three secondary circuits, each including a series-resonant and a parallel-resonant network as previously described, are energized from the transistor outputs via transformer 1110 and work into a transformer 1120 whose secondaries terminate in delta-connected three-phase leads 1155A, 1155B and 1155C.

The primary circuits of the auxiliary transformers 1140A, 114B and 1140C include respective resistances 1156A, 1156B and 1156C. In addition, the primary of transformer 1140B is in series with a condenser 1157 whereas the primary of transformer 1140C is in series with an inductance 1158. The values of the reactances 1157 and 1158 are so chosen that phase shifts of 60° leading and lagging, respectively, are produced thereby; since, in addition, the connections of transformers 1140B and 1140C across the output of transformer 1130 are reversed with respect to the connection of transformer 1140, as shown in the drawing, the voltages induced in the secondaries of the three auxiliary transformers are out of phase with one another by 120°. By this simple arrangement a very efficient and stable generator of three-phase current is obtained.

As illustrated in dotted lines, the system of FIG. 11 could also be rendered self-oscillatory by connecting the primary winding 1131 of input transformer 1130 across one of the three primaries of transformer 1120, e.g. winding 1121A. In this case, in order to make the oscillator self-starting, it will be desirable to replace the biasing batteries shown in the figure by resistance-capacitance networks as illustrated in other embodiments.

Figure 12:
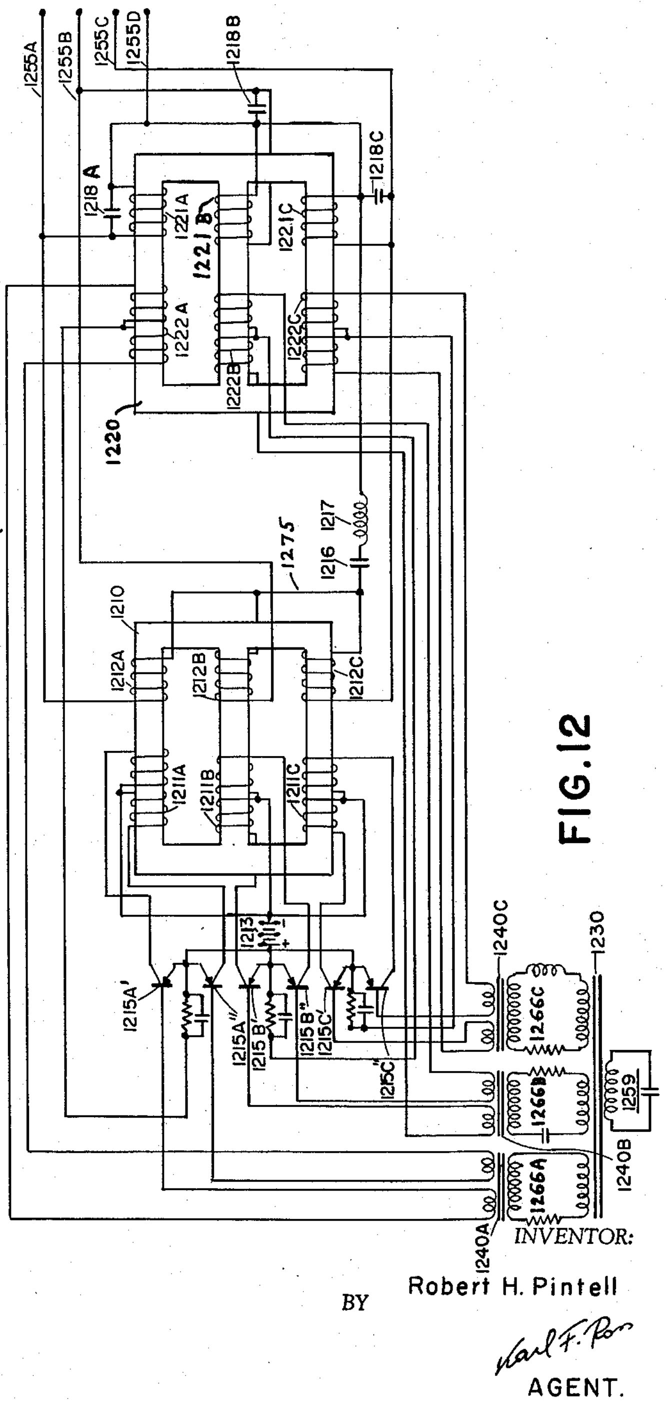

FIG. 12 represents a self-oscillating embodiment of a generator of three-phase current according to the invention. The emitter-collector circuits of three transistor pairs 1215A', 1215A'', 1215B', 1215B'', 1215C', 1215C'' are connected in push-pull, in series with battery 1213, across the split primary windings 1211A, 1211B, 1211C of an E-core coupling transformer 1210 having secondaries 1212A, 1212B, 1212C connected between ground and respective phase conductors 1255A, 1255B, 1255C constituting a Y-network. A neutral conductor is shown at 1255D. Between these conductors and a common lead 1275, in series with a common series-resonant circuit 1216, 1217, are connected the primary windings 1221A, 1221B, 1221C of an E-core feedback transformer 1220 tuned by respective condensers 1218A, 1218B, 1218C. The split secondary windings 1222A, 1222B, 1222C of transformer 1220 are connected in push-pull, via respective resistance-capacitance networks as described above, across the emitter-base circuits of the transistor pairs.

The E-cores of transformers 1210 and 1220, while tending to maintain the fluxes of the three phases in balance, do not by themselves establish the desired phase relationship therebetween. In some cases it will be possible to insure proper phasing by the load itself, as where the latter is a three-phase motor. More generally, however, I prefer to provide phase-stabilizing means here shown as a tank circuit 1259 whose inductance is the primary winding of a transformer 1230; the secondaries of this transformer form part of three phasing networks including a resistive network 1266A, a predominantly capacitive network 1266B and a predominantly inductive network 1266C. The three networks are coupled via transformers 1240A, 1240B, 1240C to the transistor inputs, each having two secondary windings in series with respective halves of secondaries 1222A, 1222B, 1222C of feedback transformer 1220. It will be understood that, in the manner illustrated in FIG. 11, the single primary of transformer 1230 may also be connected between conductor 1255A and ground instead of forming part of a tank circuit 1259; in this case the coupling network 1266A could be omitted since the circuit of transistors 1215A', 1215A'' is naturally in phase with the voltage on conductor 1255A.

Figure 13:
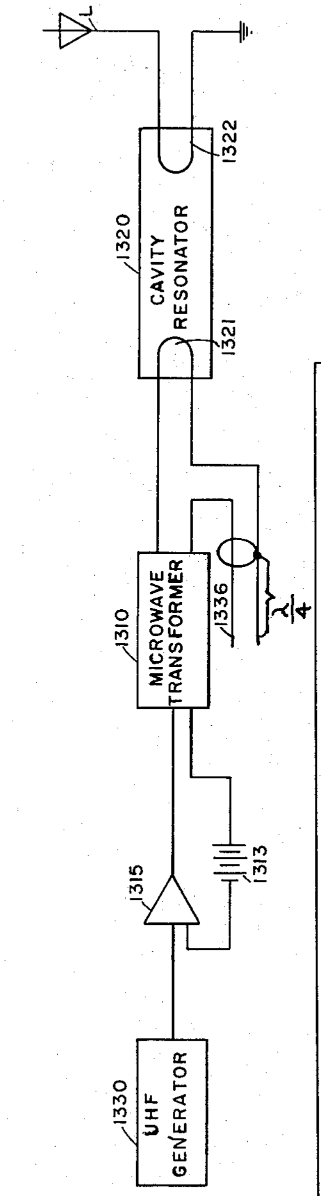

The invention can also be realized with distributed impedances in lieu of the lumped capacitances and inductances shown in FIGS. 1–12. An illustrative embodiment of this type is shown in FIG. 13 where a source 1330 of ultra-high-frequency waves works into a U.H.F. amplifier 1315, such as a klystron or a traveling-wave tube, powered by a battery 1313. The output of amplifier 1315 is delivered to a microwave transformer 1310, which may be in the form of a wave guide, and through it to a secondary circuit including a series-resonant device 1336 and a parallel-resonant device 1320. Device 1336 is shown as an open-circuited quarter-wavelength coaxial line whereas device 1320 is represented by a cavity resonator with an input loop 1321 and with an output loop 1322 coupled to the load L (here shown as an antenna).

While the system of FIG. 13 is analogous to that of FIG. 1, it will be apparent that any of the other embodiments described above may be modified in similar manner for use at extremely high frequencies.

The amplifiers and oscillators herein disclosed may also be provided with amplitude-regulating and frequency-stabilizing networks preferably incorporating breakdown devices such as Zener diodes or glow tubes, e.g. as shown in FIGS. 3 and 4 of my above-identified co-pending application Ser. No. 603,060. Regulating systems of this nature do not form part of my present invention but have been fully described and illustrated in my co-pending application Ser. No. 738,538, filed on even date herewith.

The efficiency of a system according to my present invention, when used as a D.C.-to-A.C. converter, has been found to be as high as 96%, in contradistinction to known converters having a maximum efficiency of about 70%. The system will operate satisfactorily with loads whose power factors range from .3 leading through unity to .3 lagging.

While the parallel-resonant network preferably forming part of the load circuit of a system according to the invention is not absolutely essential (an embodiment without such network having been illustrated in FIG. 6), it may be mentioned that also the series-resonant network may be modified by omitting either its capacitive or its inductive impedance portion. This will be particularly the case where the parallel-resonant network is detuned by the load or otherwise modified to represent a reactance resonating the remaining reactance of the series network. In this event, however, it will generally be necessary to include either the load itself or some other resistance in series with these reactances, e.g. as illustrated in FIG. 6, in order to limit the amplitude of the oscillating current. Moreover, a series capacitance will normally be indispensable in any system, such as that shown in FIG. 2 or 4, in which the secondary circuit is conductively connected to the source of driving direct current in the primary circuit.

Other modifications and adaptations, including combinations of compatible features from different embodiments particularly illustrated in the drawing, will be readily apparent to persons skilled in the art and are intended to be included in the scope of the present invention as defined in the appended claims.

I claim:

1. In a generator for sinusoidal waves, in combination, a primary circuit, and a secondary circuit coupled to said primary circuit and to a load; said primary circuit comprising a source of electromotive force, switch means connected across said source and control means for periodically operating said switch means, thereby producing a square wave having a fundamental frequency corresponding to the operating period of said switch means; said secondary circuit comprising a series-resonant network tuned to substantially said fundamental frequency; said control means comprising feedback means inductively coupled to said secondary circuit whereby said operating period is identical with the frequency passed by said series-resonant network.

2. In a generator for sinusoidal waves, in combination, a primary circuit, and a secondary circuit coupled to said primary circuit and to a load; said primary circuit comprising a source of electromotive force, switch means connected across said source and control means for intermittently operating said switch means at a predetermined cadence, thereby producing a square wave having a fundamental frequency related to said cadence; said secondary circuit comprising a series-resonant network and a parallel-resonant network both tuned to substantially said fundamental frequency, said parallel-resonant network being connected in series with said series-resonant network; said control means comprising feedback means coupled to said parallel-resonant network whereby said cadence is determined by the frequency of a sinusoidal current oscillating in said secondary circuit.

3. In a generator for sinusoidal waves, in combination, a primary circuit, a secondary circuit and a first transformer coupling said primary circuit to said secondary circuit; said primary circuit comprising a source of electromotive force, switch means connected across said source and control means for periodically operating said switch means, thereby producing a square wave having a fundamental frequency corresponding to the operating period of said switch means; said secondary circuit comprising a series-resonant network and a parallel-resonant network both tuned to substantially said fundamental frequency, said parallel-resonant network being connected in series with said series-resonant network; said control means comprising a second transformer having a primary winding constituting at least part of a branch of said parallel-resonant network, said second transformer further having a secondary winding connected to said switch means whereby said operating period is identical with the frequency of a sinusoidal current oscillating in said secondary circuit.

4. The combination according to claim 3 wherein said first transformer is provided with an auxiliary winding serially inserted between said secondary winding and said switch means.

5. In a generator for sinusoidal waves, in combination, a primary circuit, and a secondary circuit coupled to said primary circuit and to a load; said primary circuit comprising a source of electromotive force, amplifier means connected across said source and control means for intermittently blocking and unblocking said amplifier means at a predetermined cadence, thereby producing a square wave having a fundamental frequency related to said cadence; said secondary circuit comprising a series-resonant network and a parallel-resonant network both tuned to substantially said fundamental frequency, said parallel-resonant network being connected in series with said series-resonant network; said control means comprising feedback means coupled to said parallel-resonant network whereby said cadence is determined by the frequency of a sinusoidal current oscillating in said secondary circuit.

6. In a generator for sinusoidal waves, in combination, a primary circuit, a secondary circuit and a first transformer coupling said primary circuit to said secondary circuit; said primary circuit comprising a source of electromotive force, amplifier means connected across said source and control means for periodically blocking and unblocking said amplifier means, thereby producing a square wave having a fundamental frequency corresponding to the operating period of said amplifier means; said secondary circuit comprising a series-resonant network and a parallel-resonant network both tuned to substantially said fundamental frequency, said parallel-resonant network being connected in series with said series-resonant network; said control means comprising a second transformer having a primary winding constituting at least part of a branch of said parallel-resonant network, said second transformer further having a secondary winding connected to said amplifier means whereby said operating period is identical with the frequency of a sinusoidal current oscillating in said secondary circuit.

7. The combination according to claim 6 wherein said first transformer is provided with an auxiliary winding serially inserted between said secondary winding and said amplifier means.

8. In a generator for sinusoidal waves, in combination, a primary circuit, and a secondary circuit coupled to said primary circuit and to a load; said primary circuit comprising a source of electromotive force, a pair of electric discharge devices connected in push-pull across said source and control means for intermittently blocking and unblocking said devices, respectively, at a predetermined cadence, thereby producing a square wave having a fundamental frequency related to said cadence; said secondary circuit comprising a series-resonant network and a parallel-resonant network both tuned to substantially said fundamental frequency, said parallel-resonant network being connected in series with said series-resonant network; said control means comprising feedback means coupled to said parallel-resonant network whereby said cadence is determined by the frequency of a sinusoidal current oscillating in said secondary circuit.

9. In a generator for sinusoidal waves, in combination, a primary circuit, a secondary circuit and a first transformer coupling said primary circuit to said secondary circuit; said primary circuit comprising a source of electromotive force, a pair of electric discharge devices connected across said source and control means for periodically blocking and unblocking said devices, respectively, thereby producing a square wave having a fundamental frequency corresponding to the operating period of said devices; said secondary circuit comprising a series-resonant network and a parallel-resonant network both tuned to substantially said fundamental frequency, said parallel-resonant network being connected in series with said series-resonant network; said control means comprising a second transformer having a primary winding constituting at least part of a branch of said parallel-resonant network, said second transformer further having a seconday winding connected to said devices whereby said operating period is identical with the frequency of a sinusoidal current oscillating in said secondary circuit.

10. The combination according to claim 9 wherein said first transformer is provided with an auxiliary winding serially inserted between said secondary winding and said discharge devices.

11. In a generator for sinusoidal waves, in combination, a primary circuit, and a secondary circuit coupled to said primary circuit and to a load; said primary circuit comprising a source of electromotive force, a pair of transistors connected in push-pull across said source and control means for intermittently blocking and unblocking said transistors, respectively, at a predetermined cadence, thereby producing a square wave having a fundamental frequency related to said cadence; said secondary circuit comprising a series-resonant network and a parallel-resonant network both tuned to substantially said fundamental frequency, said parallel-resonant network being connected in series with said series-resonant network; said control means comprising feedback means coupled to said parallel-resonant network whereby said cadence is determined by the frequency of a sinusoidal current oscillating in said secondary circuit.

12. In a generator for sinusoidal waves, in combination, a primary circuit, a secondary circuit and a first transformer coupling said primary circuit to said secondary circuit; said primary circuit comprising a source of electromotive force, a pair of transistors connected across said source and control means for periodicaly blocking and unblocking said transistors, respectively, thereby producing a square wave having a fundamental frequency corresponding to the operating period of said transistors; said secondary circuit comprising a series-resonant network and a parallel-resonant network both tuned to substantially said fundamental frequency, said parallel-resonant network being connected in series with said series-resonant network; said control means comprising a second transformer having a primary winding constituting at least part of a branch of said parallel-resonant network, said second transformer further having a secondary winding connected to said transistors whereby said operating period is identical with the frequency of a sinusoidal current oscillating in said secondary circuit.

13. The combination according to claim 12 wherein said first transformer is provided with an auxiliary winding serially inserted between said secondary winding and said transistors.

References Cited in the file of this patent

UNITED STATES PATENTS

| | | |
|---|---|---|
| 1,714,697 | Stevenson | May 28, 1928 |
| 2,322,597 | Short | June 22, 1943 |
| 2,459,822 | Lalande | Jan. 25, 1949 |
| 2,491,382 | Lee | Dec. 13, 1949 |
| 2,612,631 | Distin et al. | Sept. 30, 1952 |
| 2,633,560 | Brown | Mar. 31, 1953 |
| 2,756,381 | Rolf | July 24, 1956 |
| 2,758,271 | Rolf | Aug. 7, 1956 |
| 2,777,108 | Read et al. | Jan. 8, 1957 |
| 2,848,614 | Lyons | Aug. 19, 1958 |
| 2,848,678 | Kesselring et al. | Aug. 19, 1958 |
| 2,852,730 | Magnuski | Sept. 16, 1958 |
| 2,899,626 | Brown | Aug. 11, 1959 |

FOREIGN PATENTS

| | | |
|---|---|---|
| 563,529 | Great Britain | Aug. 18, 1944 |